(12) United States Patent
Nozaki

(10) Patent No.: US 8,390,831 B2
(45) Date of Patent: Mar. 5, 2013

(54) IMAGE PROCESSING APPARATUS, METHOD FOR SAME, IMAGE READING SYSTEM, METHOD OF CONTROLLING IMAGE READING SYSTEM

(75) Inventor: Akira Nozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 774 days.

(21) Appl. No.: 12/537,993

(22) Filed: Aug. 7, 2009

(65) Prior Publication Data
US 2010/0037134 A1 Feb. 11, 2010

(30) Foreign Application Priority Data
Aug. 8, 2008 (JP) ................... 2008-205614

(51) Int. Cl.
G06F 3/12 (2006.01)
G06F 15/00 (2006.01)
G06K 1/00 (2006.01)
H04N 1/04 (2006.01)

(52) U.S. Cl. .......... 358/1.13; 358/1.3; 358/1.1; 358/1.9; 358/1.6; 358/474

(58) Field of Classification Search ................... None
See application file for complete search history.

(56) References Cited

U.S. PATENT DOCUMENTS

| | | | |
|---|---|---|---|
| 6,069,707 A * | 5/2000 | Pekelman ................. | 358/1.6 |
| 6,134,017 A | 10/2000 | Schlank et al. | |
| 6,281,983 B1 * | 8/2001 | Takahashi et al. ............ | 358/1.2 |
| 6,373,590 B1 * | 4/2002 | Ancin et al. ................. | 358/1.18 |
| 6,385,351 B1 * | 5/2002 | Simske et al. ................ | 382/312 |
| 6,643,028 B1 * | 11/2003 | Ogaki et al. ................. | 358/1.6 |
| 7,710,596 B2 * | 5/2010 | Shibao ......................... | 358/1.9 |
| 2001/0014184 A1 | 8/2001 | Bubie et al. | |
| 2002/0048413 A1 | 4/2002 | Kusunoki | |
| 2002/0054400 A1 | 5/2002 | Sato | |
| 2002/0135621 A1 | 9/2002 | Angiulo et al. | |
| 2005/0168763 A1 * | 8/2005 | Higuchi et al. ............. | 358/1.13 |
| 2011/0026084 A1 * | 2/2011 | Kato et al. ................... | 358/474 |

FOREIGN PATENT DOCUMENTS

| | | |
|---|---|---|
| EP | 1739498 A2 | 1/2007 |
| JP | 11-109797 | 4/1999 |
| JP | 2000-147944 A | 5/2000 |
| JP | 2003-051935 A | 2/2003 |
| JP | 2003-309703 | 10/2003 |
| JP | 2006-287360 A | 10/2006 |
| JP | 2007-199886 A | 8/2007 |

* cited by examiner

*Primary Examiner* — Satwant Singh

(74) *Attorney, Agent, or Firm* — Canon USA Inc. IP Division

(57) ABSTRACT

A guidance display control unit performing control so that operation guidance is displayed in a preview display area provided to preview-display image data read by an image reading apparatus is provided, where the operation guidance is used to read the image corresponding to the preview display area.

10 Claims, 9 Drawing Sheets

IMAGE PROCESSING APPARATUS, METHOD FOR SAME, IMAGE READING SYSTEM, METHOD OF CONTROLLING IMAGE READING SYSTEM

BACKGROUND OF THE INVENTION

1. Field of the Invention

The present invention relates to operation guidance display performed to make a user effectively identify appropriate operation guidance through an image reading apparatus and an image reading system.

2. Description of the Related Art

In the case where an image reading apparatus is used and the case where an image reading system including the image reading apparatus and an information processing apparatus is used, it is often difficult for a user to obtain an appropriate scanning result when the user incorrectly places a document on a document plate. Therefore, the technology for displaying the scanning result on a preview screen for confirmation has been widely available. Further, there is the technology for displaying operation guidance indicating a document placement method and information about the document orientation so that the user can correctly place the document on the document plate. The above-described technology allows for attracting the attention of the user to decrease operation mistakes and increase the operability.

Japanese Patent Laid-Open No. 11-109797 discloses the technology of performing a guidance display. If the user is made to select either upward orientation or leftward orientation as the orientation of an image shown on a document set on a document table and the document image read based on the selection is rotated, the user is made to select the document orientation through a drawing shown on the operation panel of an image reading apparatus. At the same time, operation guidance provided for the document placement relating to the selected orientation is displayed.

Further, Japanese Patent Laid-Open No. 2003-309703 also discloses a method of displaying operation guidance relating to the document placement on the operation panel of a reading apparatus. More specifically, when a double-sided document is reversed when being placed on an automatic document feeder (ADF), only the side opposite to the side the user wishes to read is read. When a single-sided document is reversed when being placed on the ADF, the blank side is read. Therefore, the above-described operation guidance indicates a placement method relating to the obverse direction and the reverse direction of the image face of a document.

However, both the preview display area and the guidance display area are prepared in a limited display area so as to display the guidance while previewing the reading result. Therefore, if one of the above-described display areas is increased in size, the other is decreased in size. Otherwise, if the above-described display areas are displayed by using windows, one of the windows is hidden behind the other.

Further, there has been a reading method (mode) which allows for combining image data items after the image data items are scanned from a plurality of documents so that a single image data item is generated. For performing the above-described processing, a reading operation should be performed after the documents corresponding to individual divided areas of an original document are correctly placed on a document plate in a correct order within a series of actions which is started from when the document reading is started and finished after the image data items are stuck together. Thus, in the case where at least two different reading operations continuously occur in a single mode, the display area is provided for each of image data items for reading, the image data items being obtained by separating the preview result image from the guidance image according to known technologies. Therefore, it has been difficult to provide appropriate guidance with appropriate visibility for the next operation which shall be performed by a user.

The term "sticking together" will be used in this patent specification to mean the combination of parts of an image that are separately scanned or otherwise read by an image reading apparatus and then combined to form a single digital image.

SUMMARY OF THE INVENTION

According to an aspect of the present invention, there is provided an image reading apparatus including a document plate on which a document is placed, a reading unit configured to read the document placed on the document plate, a display unit connected to the reading device and configured to display information to a user, a preview unit configured to cause the display unit to display preview image data corresponding to image data read by the reading unit, a guidance control unit configured to cause the display unit to display operation guidance to allow a user to determine how to operate the reading device, and a mode setting unit configured to control setting of a reading mode in which a single electronic image data item is generated based on a plurality of electronic image data items obtained through the reading unit, wherein when the reading mode is set, the guidance control unit causes the display unit to display a divided preview area into which the read image data is to be preview-displayed by the preview unit based on details of the set reading mode, and controls the display of the operation guidance corresponding to each of the divided preview areas.

According to another aspect of the present invention, there is provided a method for an image reading apparatus comprising a reading device for reading a document placed on a document plate and a display unit connected to the reading device and configured to display information to a user, the method including causing the display unit to display preview image data corresponding to image data read by the reading unit, causing the display unit to display operation guidance to allow a user to determine how to operate the reading device, controlling setting of a reading mode in which a single electronic image data item is generated based on a plurality of electronic image data items obtained through the reading unit, causing, when the reading mode is set, the display unit to display a divided preview area into which the read image data is to be preview-displayed based on details of the set reading mode, and controlling the display of the operation guidance corresponding to each of the divided preview areas.

According to another aspect of the present invention, there is provided an image reading system including an image reading apparatus that reads a document placed on a document plate and an information processing device connected to the image reading apparatus via an interface, wherein the image reading apparatus includes a document plate on which a document is placed, and a transmission unit configured to read the document placed on the document plate based on a read instruction transmitted from the information processing device and transmit the read image data to the information processing device, wherein the information processing device includes a mode setting unit configured to set reading mode in which the document reading is performed, a guidance display control unit configured to control a display of operation guidance based on the set reading mode, a read instruction unit configured to issue an instruction to read the document placed on the document plate for the image reading apparatus based on the set reading mode, and a preview unit configured to acquire image data read and obtained by the image reading apparatus, and preview-display the image data, wherein the reading mode that can be set through the mode setting unit includes image merging-and-reading mode in which a single image data item is generated based on a plurality of image data items obtained by the image reading apparatus, and when the image merging-and-reading mode is set, the guidance display control unit performs control so that an area in which the read image data is preview-displayed through the previewing unit is divided into a plurality of preview areas and the operation guidance corresponding to each of the divided preview areas is displayed.

According to another aspect of the present invention, there is provided a method of controlling an image reading system including an image reading apparatus that reads a document placed on a document plate and an information processing device connected to the image reading apparatus via an interface, the method comprising the steps of setting reading mode in which the document is read, controlling a display of operation guidance, the display being performed when the document is read, based on the set reading mode, reading the document placed on the document plate based on the set reading mode, and preview-displaying image data obtained through reading the document, wherein the reading mode that can be set at the mode setting step includes image merging-and-reading mode in which a single image data item is generated based on a plurality of image data items obtained by the image reading apparatus, and when the image merging-and-reading mode is set, control is performed at the guidance display control step so that an area in which the read image data is preview-displayed at the previewing step is divided into a plurality of preview areas and the operation guidance corresponding to each of the divided preview areas is displayed.

According to the above-described image reading apparatus, method for the image reading apparatus, image reading system, and method of controlling the image reading system that perform the above-described processing, it becomes possible to display operation guidance provided for a reading operation that shall be performed by the user in a preview display area in which image data read by the image reading apparatus is previewed. Consequently, the user can effectively identify appropriate operation guidance while using a limited display area profitably.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the present invention.

DESCRIPTION OF THE EMBODIMENTS

Hereinafter, embodiments of the present invention will be described in detail with reference to the attached drawings.

Figure 1:
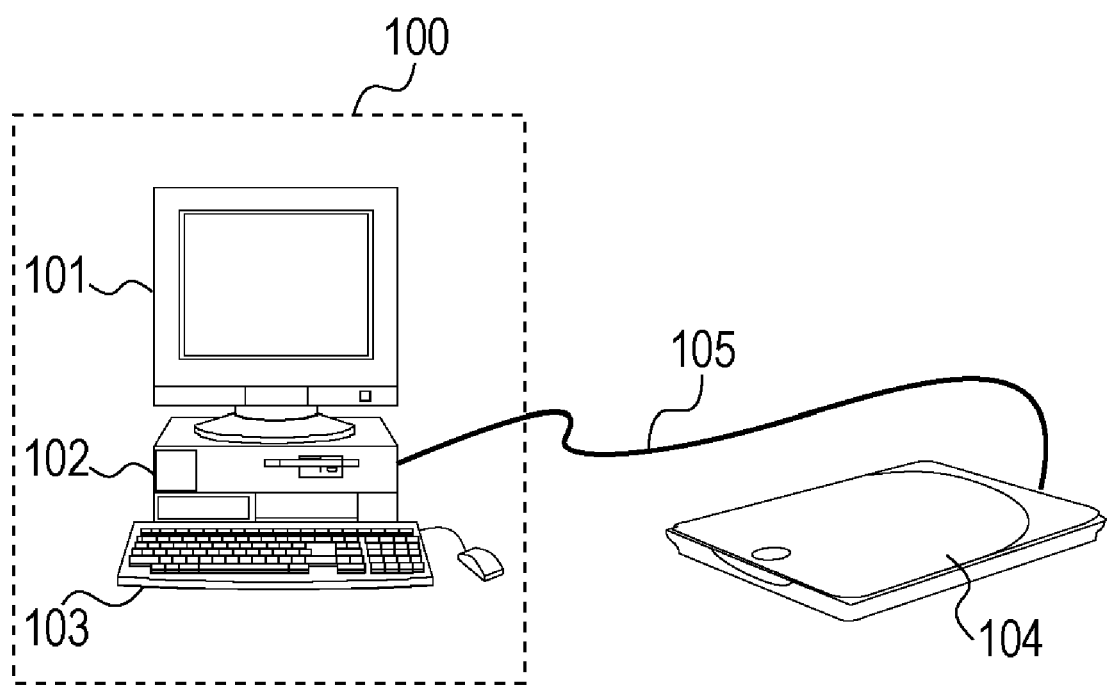
FIG. 1 is a diagram showing an image reading system provided with a guidance display method according to an embodiment of the present invention.

FIG. 1 is a diagram showing an exemplary image reading system 200 according to a first embodiment of the present invention. According to FIG. 1, an information processing apparatus 100 having a scanner driver installed therein and a scanner 104 functioning as a reading device are connected to each other via a bidirectional interface 105 such as a universal serial bus (USB) interface, where the information processing apparatus 100 includes a display device 101, a controller unit 102, an input device 103, and so forth.

Hereinafter, the image reading system 200 of the first embodiment will be described in detail.

Figure 2:
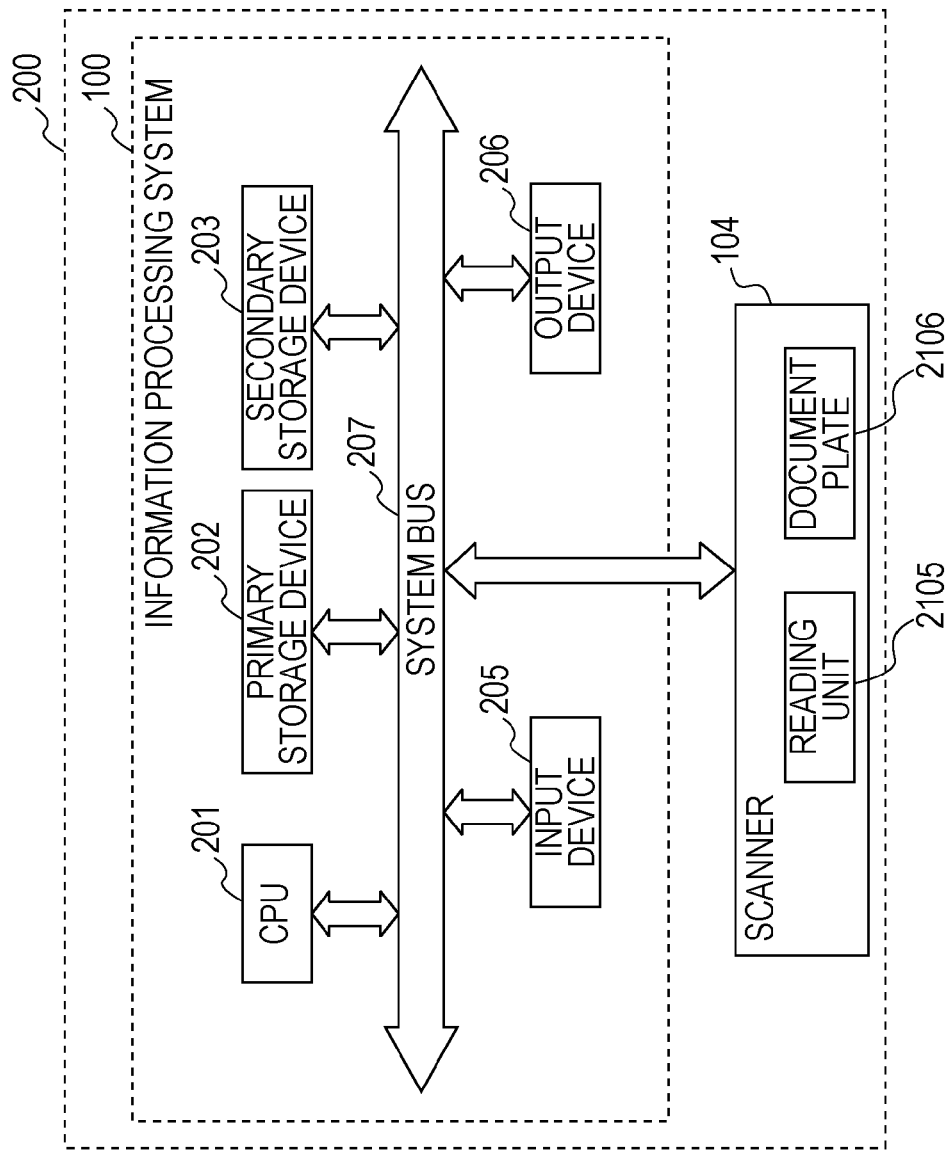
FIG. 2 is a block diagram illustrating the configuration of the above-described image reading system.

FIG. 2 is a block diagram illustrating the configuration of the image reading system 200 of the first embodiment, where the block diagram shows an exemplary basic hardware configuration of the information processing apparatus 100 to which the scanner 104 is connected. The image reading system 200 is configured so that data scanned off a document placed on the document plate of the scanner 104 is stored in a primary storage device 202 and/or a secondary storage device 203 and displayed through an output device 206.

Hereinafter, the configuration and the operations of the image reading system 200 will be specifically described.

A central processing unit (CPU) 201 calculates, determines, and controls data and/or an instruction, and executes a program stored in the primary storage device 202, for example. The main part of the primary storage device 202 is a memory configured to load and store a program or the like stored in the secondary storage device 203 provided as a hard disk, for example. According to the above-described embodiment, a program is stored in the secondary storage device 203, and loaded into the primary storage device 202 and executed through the CPU 201 at the program execution time.

The scanner 104 is a device having a scanning function. The reading unit 2105 is a scanning unit configured to scan data off a document placed on a document plate 2106.

An input device 205 includes a mouse, a keyboard, and so forth. The output device 206 includes a display or the like.

A system bus 207 denotes a transfer path provided to transfer an instruction and/or data between the CPU 201, the output device 206, the storage devices 202 and 203, and so forth.

Figure 3A:
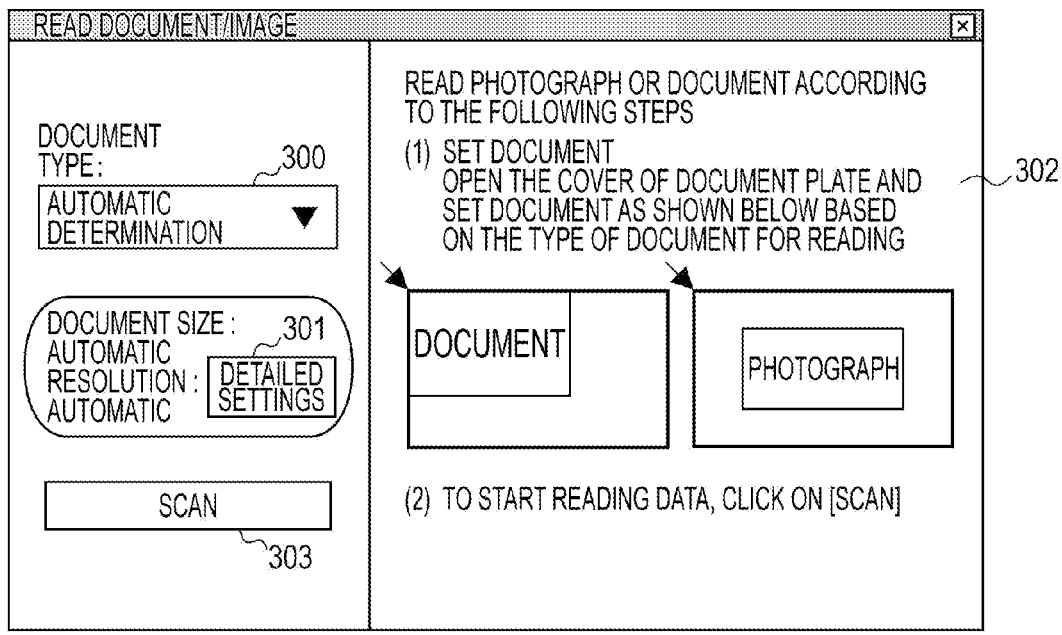
FIG. 3A is a schematic diagram of the display screen of a scan utility according to a first embodiment of the present invention achieved to perform a guidance display.
Figure 3B:
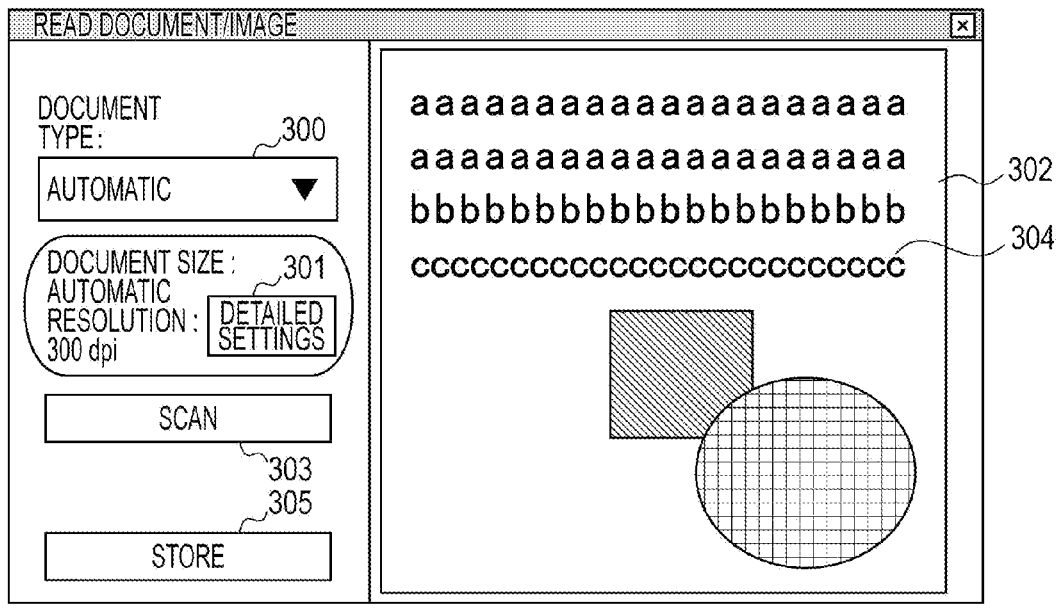
FIG. 3B is another schematic diagram of the display screen of the scan utility according to the first embodiment of the present invention achieved to perform the guidance display.

Each of FIGS. 3A and 3B is a schematic diagram of the display screen of a scan utility according to the first embodiment of the present invention achieved to perform a guidance display.

A combo box 300 is provided to set the type of a document for reading. A user selects the type of a document for which reading is actually performed, where the document type may correspond to automatic determination, a color photograph, a monochrome photograph, a color document, a monochrome document, and so forth. Consequently, a read setting appropriate for the document for reading is made.

A button 301 provided to make a detailed read setting allows for changing the read setting in various ways through a dialogue image displayed at the press of the button 301 when the user wishes to closely customize the read setting.

A preview display part 302 is an area in which the preview of an image scanned at the press of a scanning execution button 303 is displayed. Before the document is read, a guidance image indicating the method of placing the document is displayed in the preview display area. The above-described guidance image indicates documents that are placed based on the read datum points of the scanner 104. The user places the document based on the displayed guidance image and executes scanning by pressing the scanning execution button 303. After the scanning is executed, the guidance image turns off and a preview image 304 showing the scanned document data is displayed in the area where the guidance image was displayed, as shown in FIG. 3B.

A storage button 305 is pressed to store the scanned document data.

Next, a second embodiment of the present invention achieved to perform the guidance display will be described with reference to a flowchart of FIG. 8 and screen images shown in FIGS. 3A and 3B, FIG. 4, and FIGS. 5A, 5B, 5C, 5D, and 5E.

In reading mode selected in the above-described embodiment, read operations are performed so that documents are stuck together. More specifically, in the above-described reading mode, a single image data item is generated based on image data items that are obtained through a read operation performed a plurality of times. A single image data item is generated by merging document data items that are obtained through a plurality of read operations with one another, as if the document data items are stuck together.

Figure 4:
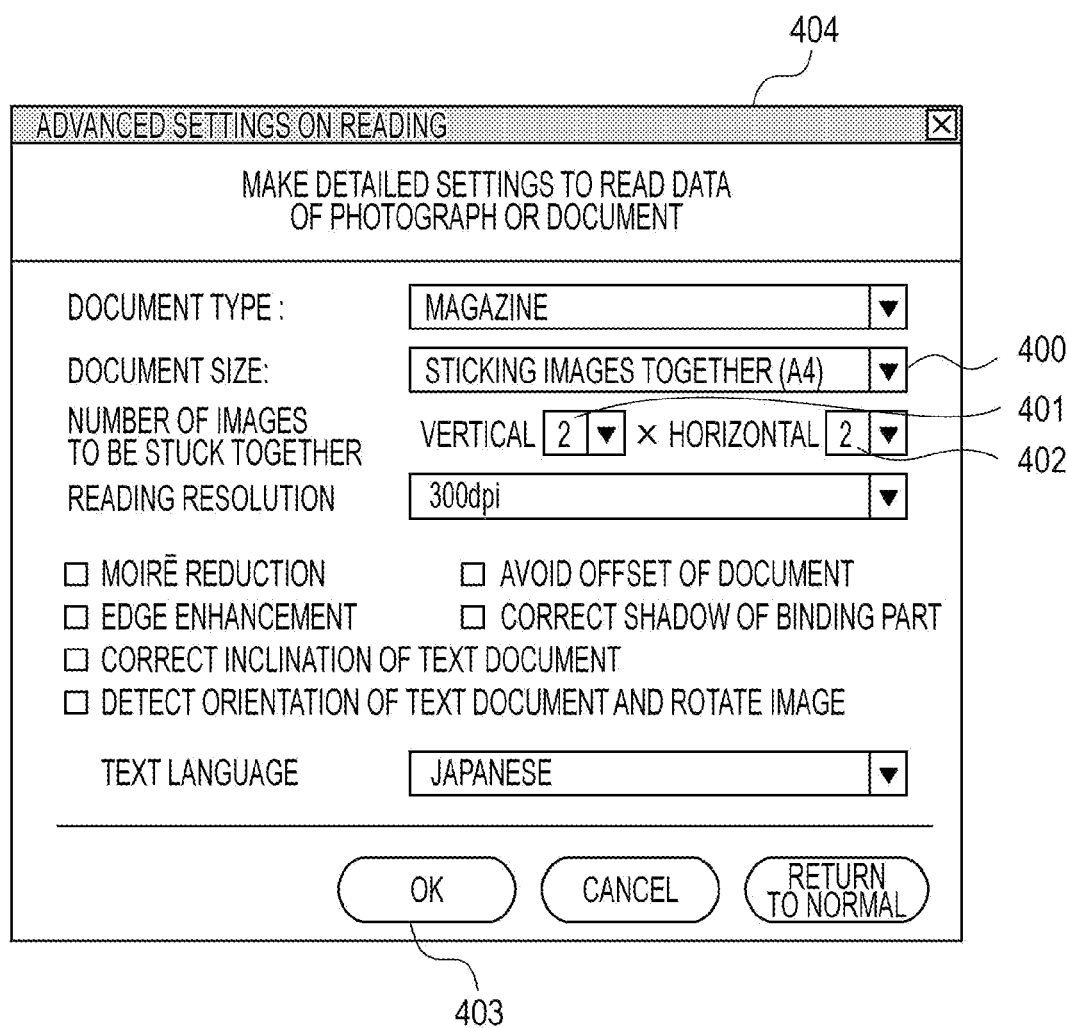
FIG. 4 is a diagram showing a screen provided to set the details of the reading of the scan utility.
Figure 8:
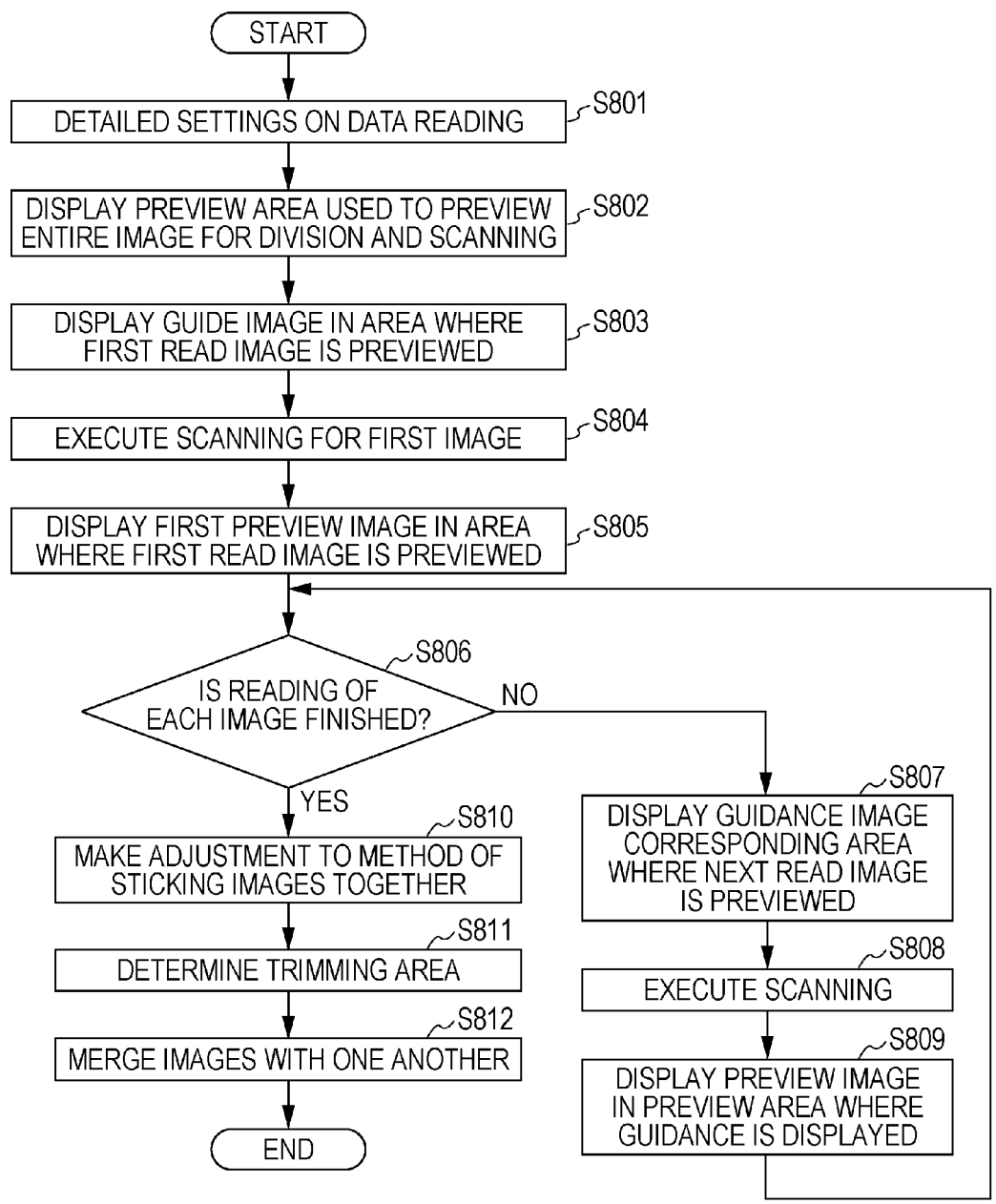
FIG. 8 is a flowchart illustrating the second embodiment.

Referring to FIG. 8, at step S801, a detailed read setting is made. When the detailed read setting button 301 shown in FIG. 3A is pressed by the user, a screen 404 provided to set the details of the scan utility reading is displayed, as shown in FIG. 4. The user selects a message which reads "sticking images together (A4)" in a document-size-setting combo box 400. Further, the user selects a combo box 401 provided to specify the number of images stuck together in a vertical direction and a combo box 402 provided to specify the number of images stuck together in a horizontal direction.

In the above-described embodiments, the user made the above-described selections so that two images are stuck together in the vertical direction and two images are stuck together in the horizontal direction. Namely, the image data corresponding to an A2-sized document is obtained through scanning four A4-sized documents and merging the scanned A4 images with one another so that a single image information item is generated. In the above-described embodiment, the document size is exemplarily described as A2, which is the size of a document including four documents including two A4-sized documents stuck together in the vertical direction and two A4-sized documents stuck together in the horizontal direction. However, without being limited to the above-described size, a document of a different size may be used. Further, the number of documents stuck together in the vertical direction and the horizontal direction may vary so that the number of the documents stuck together may not be four without being limited to the above-described embodiment. Further, a single image information item may be obtained by merging image data items with one another, the image data items being obtained not only by separating an A2-sized document in four parts and scanning the separated four parts, but also by separating an A4-sized document in four parts and scanning the separated four parts.

Figure 5A:
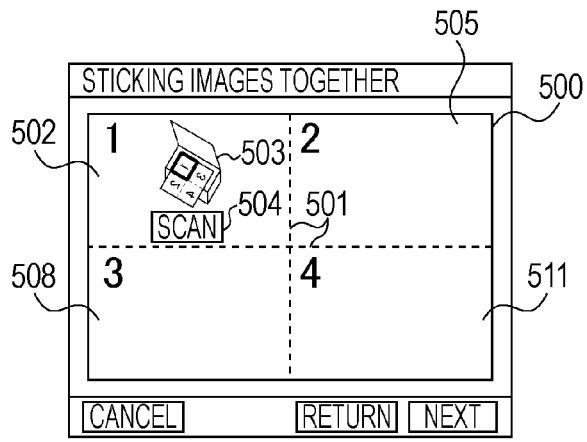
FIG. 5A is a diagram that shows a guidance image produced in a dialog screen image provided to preview the entire scanned image so as to stick a plurality of images together according to a second embodiment of the present invention achieved to perform the guidance display and that shows the transition of a preview result display.

When the details of the images stuck together are determined and a setting finish button 403 is pressed by the user, the detailed setting screen 404 is closed. Next, the user presses the scanning execution button 303 at step S802 so that a dialogue image generated to preview the entire image including images subjected to scanning so as to be stuck together is displayed, as shown in FIG. 5A. An entire frame 500 of the images subjected to the scanning so as to be stuck together indicates the area corresponding to an A2-sized document which is the aggregate of four documents including the two A4-sized documents stuck together in the vertical direction and the two A4-sized documents stuck together in the horizontal direction.

Lines 501 dividing the above-described entire frame 500 in the vertical and horizontal directions are drawn based on the number of selected documents in the combo boxes 401 and 402 so that the entire frame 500 is divided into areas 502, 505, 508, and 511. Consequently, the divided areas 502, 505, 508, and 511 correspond to an image of the A4 size which is the image size selected in the document-size-setting combo box 400.

The area 502 in which the sign "1" is written is an area into which data of the first image subjected to scanning is read. From then on, the image reading operation is performed in the order of the areas in which the signs "2", "3", and so forth are written.

Next, a guidance image 503 is displayed in the preview area of the area 502 in which the sign "1" is written at step S803. The guidance image 503 showing the document placement method is uniquely determined based on the settings shown in the combo boxes 400, 401, and 402 that are provided in the detailed read setting dialog shown in FIG. 4, the sticking position, and the read datum point of the scanner 104. Then, resource data (text data, image data, and so forth shown in the guidance image) that is stored in the secondary storage device 203 and that is used as part of the program is read in association with each of the divided areas of the preview screen, whereby the guidance image 503 is displayed.

Then, the scanning is executed through an operation performed by the user so that the guidance image 503 is displayed in the area where the document image is preview-displayed, where the details of the guidance image 503 vary as indicated by guidance images 506, 509, and 512.

In the above-described embodiment, the resource data corresponding to each area is exemplarily retained as part of the program. In another embodiment of the present invention, however, basic resource data may be prepared and resource data generated by dynamically changing the document orientation specified in the basic resource data for each read area based on information about the detailed settings shown in FIG. 4 (such as the number of documents stuck together in the vertical and horizontal directions) may be displayed.

According to the state shown in FIGS. 5A, 5B, 5C, 5D, and 5E, the user places a document on the document plate based on the guidance image 503.

Figure 5B:
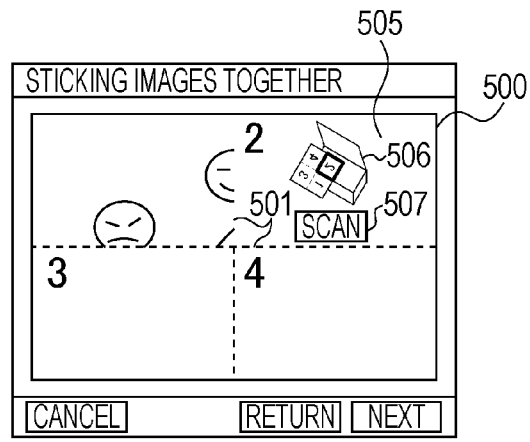
FIG. 5B is another diagram that shows the guidance image produced in the dialog screen image provided to preview the entire scanned image so as to stick the images together according to the second embodiment and that shows the transition of the preview result display.

Next, when the user presses the scanning execution button 504 at step S804, the document is scanned and image data scanned off the document is acquired. At step S805, rotation processing is performed as appropriate so that the top and the bottom of the scanned image data are correctly displayed on the preview screen. Then, the scanned image data is preview-displayed in the area 502 as shown in FIG. 5B. At step S806, it is determined whether scanning is finished for each image. If there is any image which is not scanned, the processing continues to step S807.

At step S807, the guidance image 506 showing another document placement method and a scanning execution button 507 are displayed in the area 505 in which the sign "2" is written, where data of the next scanned image is read into the area 505. At step S808, the user places a document based on the guidance image 506 displayed at that time, and presses the scanning execution button 507.

Figure 5C:
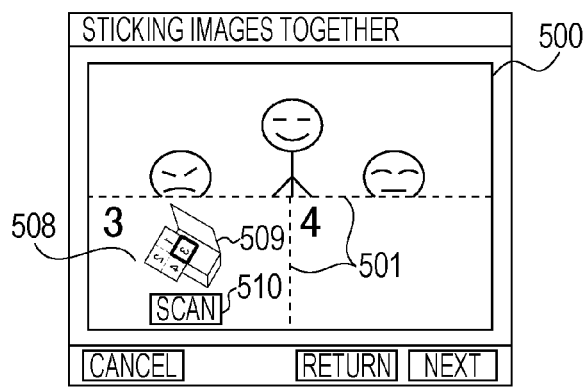
FIG. 5C is another diagram that shows the guidance image produced in the dialog screen image provided to preview the entire scanned image so as to stick the images together according to the second embodiment and that shows the transition of the preview result display.
Figure 5D:
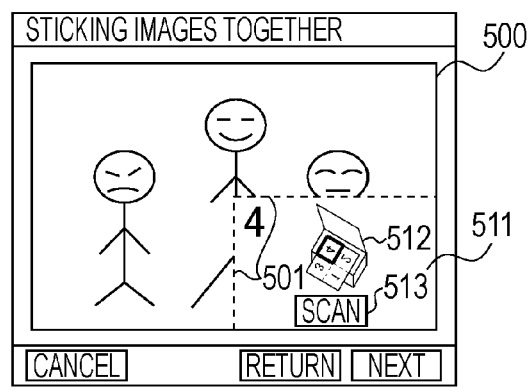
FIG. 5D is another diagram that shows the guidance image produced in the dialog screen image provided to preview the entire scanned image so as to stick the images together according to the second embodiment and that shows the transition of the preview result display.

When the user presses the scanning execution button 507 at step S809, the scanned image is preview-displayed in the area 505 in which the guidance image has been displayed through the same processing as that described above. Then, the guidance image 509 indicating another document placement method and a scanning execution button 510 are displayed in the area 508 into which the next scanned image data is read as shown in FIG. 5C.

Figure 5E:
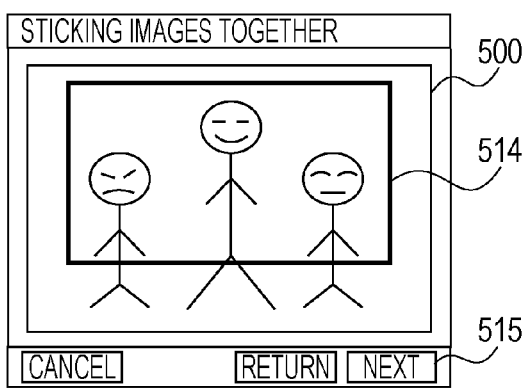
FIG. 5E is another diagram that shows the guidance image produced in the dialog screen image provided to preview the entire scanned image so as to stick the images together according to the second embodiment and that shows the transition of the preview result display.

Similarly, when the scanning execution button 510 is pressed by the user, scanned image data is preview-displayed in the area 508, and the guidance image 512 and a scanning execution button 513 are displayed in the area 511. When the scanning execution button 513 is pressed by the user, the scanned image data is displayed in the area 511 as shown in FIG. 5E, so that data of the entire image can be read.

If it is determined that the reading of the entire image data is finished at step S806, the processing advances to step S810. After the entire image data is acquired at step S810, the user drags and drops each of the divided areas into which the data is read so that the areas are placed on one another in the vertical and horizontal directions, whereby the position of each of the areas is adjusted.

At step S811, the user can adjust the range of the image data through a trimming frame 514 as appropriate. At step S812, merged image data is generated by merging the four image data items with one another based on the result of the adjustment of the image position determined by the user and the trimming area result, and the processing is finished.

Next, a third embodiment of the present invention achieved to perform a guidance display will be described. Since the processing procedures performed until the dialog image is displayed to preview the entire image including the images stuck together are the same as those described in the second embodiment, the description of the processing procedures will be omitted.

Figure 6A:
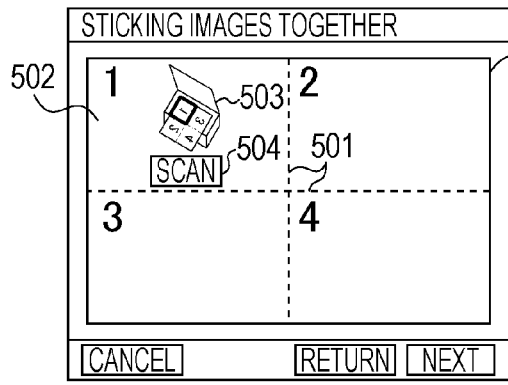
FIG. 6A is a diagram that shows a guidance image produced in a dialog screen image provided to preview the entire scanned image so as to stick a plurality of images together according to a third embodiment of the present invention achieved to perform the guidance display and that shows the transition of a preview result display.
Figure 6B:
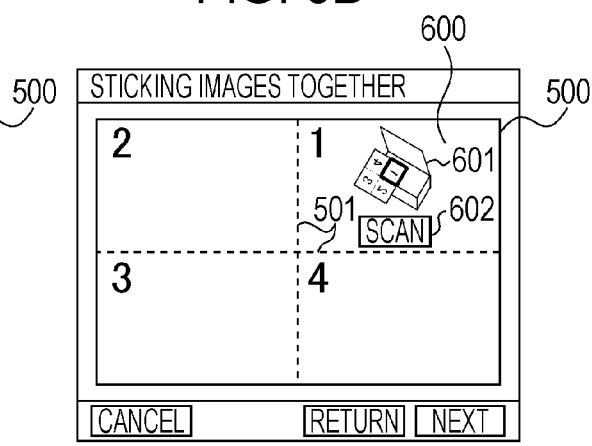
FIG. 6B is another diagram that shows the guidance image produced in the dialog screen image provided to preview the entire scanned image so as to stick the images together according to the third embodiment and that shows the transition of the preview result display.

FIG. 6A shows the state where scanning is performed for the upper-left area of the merged image. If the user wishes to start the scanning from a randomly chosen area of the merged image, the user clicks on the area with a cursor so as to select the clicked area as an area into which the next scanned image data is read. For example, if the user clicks on the area in which the sign "2" is written, the area being included in the merged image, in the state shown in FIG. 6A, the area 502 into which the next scanned image data is read becomes an area 600, the guidance image 503 and the scanning execution button 504 disappear from the area 502, and an appropriate guidance image 601 and a scanning execution button 602 are displayed in an area 600. The numbers shown in the other areas are changed as appropriate based on data displayed in the area corresponding to the sign "2".

Figure 6C:
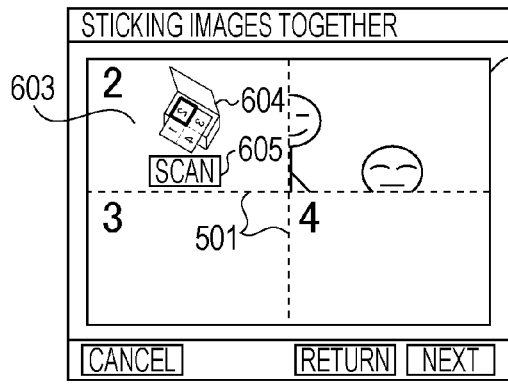
FIG. 6C is another diagram that shows the guidance image produced in the dialog screen image provided to preview the entire scanned image so as to stick the images together according to the third embodiment and that shows the transition of the preview result display.

The user places a document based on the guidance image 601 and presses the scanning execution button 602 so that a scanned image is preview-displayed in the area 600 as shown in FIG. 6C. Next, a guidance image 604 showing another document placement method and a scanning execution button 605 are displayed in an area 603 into which the next scanned image data is read. The user places a document based on the guidance image 604 displayed at that time, and presses the scanning execution button 605.

Figure 6D:
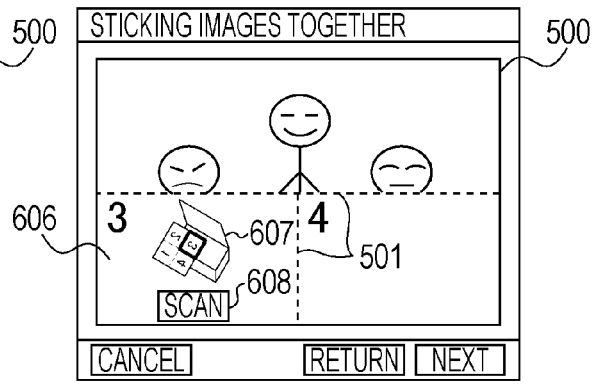
FIG. 6D is another diagram that shows the guidance image produced in the dialog screen image provided to preview the entire scanned image so as to stick the images together according to the third embodiment and that shows the transition of the preview result display.
Figure 6E:
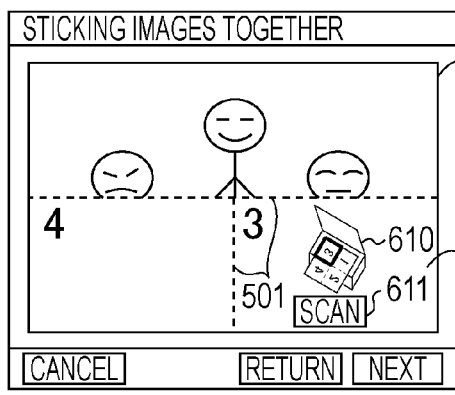
FIG. 6E is another diagram that shows the guidance image produced in the dialog screen image provided to preview the entire scanned image so as to stick the images together according to the third embodiment and that shows the transition of the preview result display.

The scanned image data is preview-displayed in the area 603 in which the guidance image has been displayed, and a guidance image 607 showing another document placement method and a scanning execution button 608 are displayed in an area 606 into which the next scanned image data is read, as shown in FIG. 6D.

FIG. 6D shows the state where scanning is performed for the lower-left area of the merged image. If the user clicks on the lower-right part of the merged image in the above-described state, the area 606 into which the next scanned image data is read becomes an area 609, the guidance image 607 and the scanning execution button 608 disappear from the area 606, and an appropriate guidance image 610 and a scanning execution button 611 are displayed in the area 609.

Figure 6F:
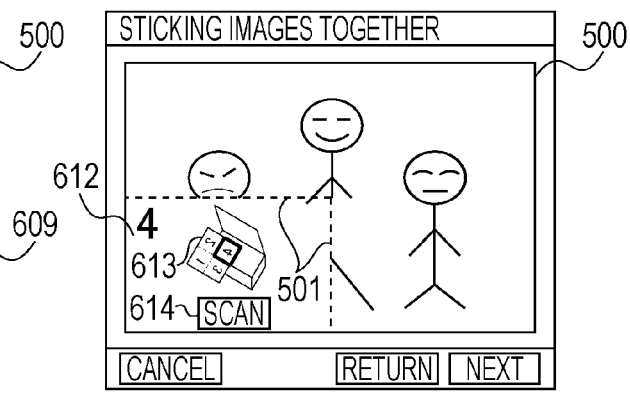
FIG. 6F is another diagram that shows the guidance image produced in the dialog screen image provided to preview the entire scanned image so as to stick the images together according to the third embodiment and that shows the transition of the preview result display.
Figure 6G:
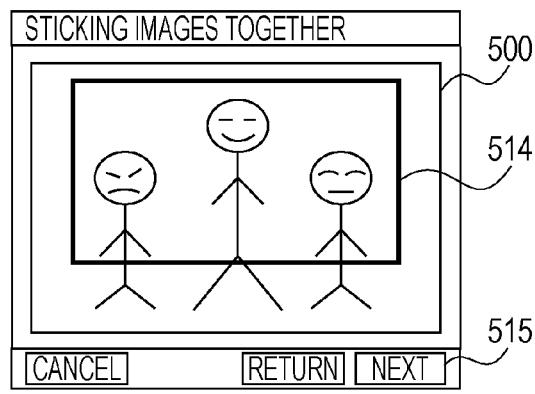
FIG. 6G is another diagram that shows the guidance image produced in the dialog screen image provided to preview the entire scanned image so as to stick the images together according to the third embodiment and that shows the transition of the preview result display.

The user places a document based on the guidance image 610 and presses the scanning execution button 611 so that a scanned image is preview-displayed in the area 609 as shown in FIG. 6F. Next, a guidance image 613 showing another document placement method and a scanning execution button 614 are displayed in an area 612 into which the next scanned image data is read. The user places a document based on the guidance image 613 displayed at that time, and presses the scanning execution button 614 so that the scanned image is displayed in the area 612 and the reading of the entire image data is finished as shown in FIG. 6G.

Since processing procedures performed after the entire image data is acquired are the same as those performed in the second embodiment, the descriptions of the processing procedures will be omitted. Thus, according to the above-described embodiment, the user clicks on an area for which the user wishes to perform scanning so that the read order is arbitrarily determined and the images are stuck together.

Next, a fourth embodiment of the present invention achieved to perform a guidance display will be described with reference to FIGS. 7A to 7E. Since the processing procedures performed until the dialog image is displayed to preview the entire image including the images stuck together are the same as those described in the second embodiment, the description of the processing procedures will be omitted.

Figure 7A:
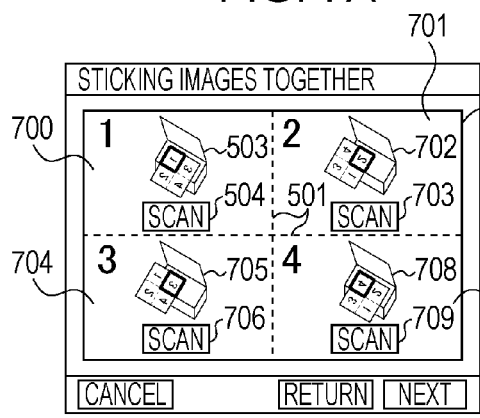
FIG. 7A is a diagram that shows a guidance image produced in a dialog screen image provided to preview the entire scanned image so as to stick a plurality of images together according to a fourth embodiment of the present invention achieved to perform the guidance display and that shows the transition of a preview result display.
Figure 7B:
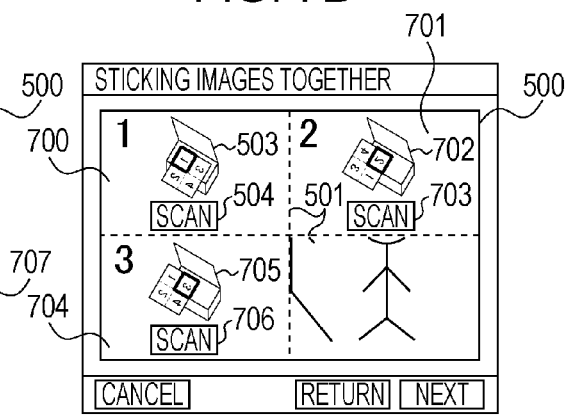
FIG. 7B is another diagram that shows the guidance image produced in the dialog screen image provided to preview the entire scanned image so as to stick the images together according to the fourth embodiment and that shows the transition of the preview result display.
Figure 7C:
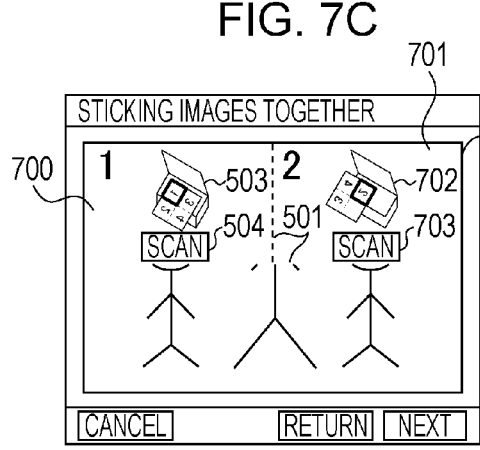
FIG. 7C is another diagram that shows the guidance image produced in the dialog screen image provided to preview the entire scanned image so as to stick the images together according to the fourth embodiment and that shows the transition of the preview result display.

According to the above-described embodiment, the guidance images 503, 702, 705, and 708, and the scanning execution buttons 504, 703, 706, and 709 are displayed in the individual divided areas into which image data items are read as shown in FIG. 7A. When the scanning execution buttons 504, 703, 706, and 709 are pressed, each of image data items read into the individual scanned image read areas 700, 701, 704, and 707 is preview-displayed. For example, when the scanning execution button 709 is pressed, a scanned image is displayed in the area 707 as shown in FIG. 7B. If the user presses the scanning execution button 706, a scanned image is preview-displayed in the area 704 as shown in FIG. 7C.

Figure 7D:
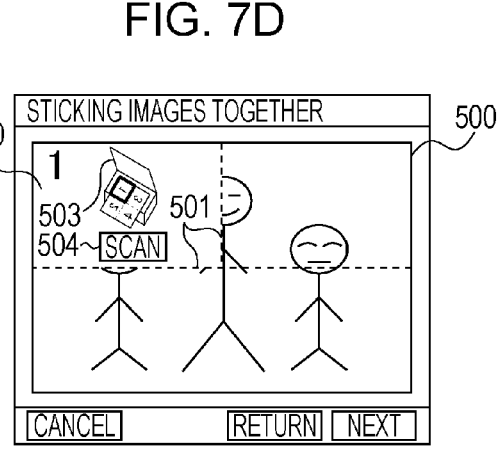
FIG. 7D is another diagram that shows the guidance image produced in the dialog screen image provided to preview the entire scanned image so as to stick the images together according to the fourth embodiment and that shows the transition of the preview result display.
Figure 7E:
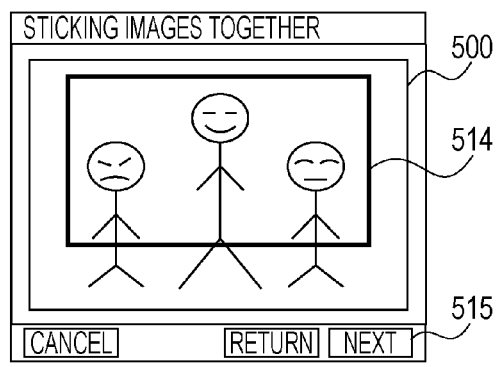
FIG. 7E is another diagram that shows the guidance image produced in the dialog screen image provided to preview the entire scanned image so as to stick the images together according to the fourth embodiment and that shows the transition of the preview result display.

After that, the user presses the scanning execution button 703 in an analogous fashion so that a scanned image is preview-displayed in the area 701 as shown in FIG. 7D, and when the user presses the scanning execution button 504, a scanned image is displayed in the area 700 as shown in FIG. 7E.

Since operations performed after the acquisition of data of the entire image are the same as those performed in the second embodiment, the description thereof will be omitted.

Thus, the guidance image and the scanning execution button are provided in each of the divided areas into which the image data is read so that the read order is arbitrarily determined and the images are stuck together.

Although the guidance image is displayed in the preview area in each of the first to fourth embodiments, the guidance image may be shown not only as the guidance image and the description thereof, but also as a movie, and the uniform resource locator (URL) of a link to guidance information.

Further, the object of the present invention is also achieved by supplying a control program implementing the functions of the above-described embodiments to a system and/or an apparatus directly and/or remotely. Further, a recording medium storing program code of software is supplied to the system and/or the apparatus. The object of the present invention is also achieved by reading and executing the program code stored in the recording medium through a computer (a central processing unit (CPU) and/or a microprocessing unit (MPU)) of the system and/or the apparatus. In that case, the program code itself read from the recording medium achieves the functions of the above-described embodiments so that the recording medium storing the program code constitutes another embodiment of the present invention.

The recording medium provided to supply the program code may be, for example, a flexible disk, a hard disk, an optical disk, a magneto-optical disk, a compact disk (CD)-read only memory (ROM), a CD-recordable (R), a magnetic tape, a nonvolatile memory card, a ROM, a digital-versatile disk (DVD), and so forth.

Further, the program may be supplied in the following methods. For example, a user accesses a home page established on the Internet by using a browser of a client computer. Then, the user downloads the computer program itself of the present invention from the home page and/or compressed file data including data on an automatic-install function to a recording medium such as a hard disk. Further, the program can be supplied by dividing program code generating the program of the present invention into plural file-data items and downloading the file-data items from different home pages. Namely, a WWW server provided to download program-file-data items used to achieve the functional processing of the present invention by using a computer to plural users is included in claims of the present invention.

Further, not only by the computer reading and executing the read program code, but also by the computer executing part of or the entire process utilizing an operating system (OS), etc. running on the computer based on instructions of the program, the functions of the above-described embodiments may be achieved.

Further, the program code read from the recording medium may be written into a memory of a function-expansion board inserted into the computer and/or a function-expansion unit connected to the computer. Then, a central processing unit (CPU), etc. of the function-expansion board and/or the function-expansion unit may execute part of or the entire actual process based on instructions of the program so that the functions of the above-described embodiments are achieved. In the above-described embodiment, the present invention was described based on the configurations of the image reading apparatus and the information processing device. However, according to another embodiment of the present invention, an image reading apparatus having a means constituting the present invention may be implemented.

According to a further aspect of the present invention, there is provided an image reading apparatus including a document plate on which a document is place, a reading unit arranged to read the document placed on the document plate, a preview unit arranged to preview-display image data obtained through the reading unit reading the document, a guidance control unit arranged to control a display of operation guidance, the display being performed when the document is read, and a mode setting unit arranged so as to be capable to set reading mode in which a single image data item is generated based on a plurality of image data items obtained through the reading unit reading the document a plurality of times, wherein when the reading mode is set, the guidance control unit divides an area in which the read image data is preview-displayed by the preview unit based on details of the set reading mode, and controls the display of the operation guidance corresponding to each of the divided preview areas.

While the present invention has been described with reference to exemplary embodiments, it is to be understood that the present invention is not limited to the above-described exemplary embodiments, and various changes and modifications can be made thereto within the spirit and scope of the present invention. Therefore, to apprise the public of the scope of the present invention, the following claims are made. The scope of the following claims is to be accorded the broadest interpretation so as to encompass all modifications and equivalent structures and functions.

This application claims priority from Japanese Patent Application No. 2008-205614 filed on Aug. 8, 2008, which is hereby incorporated by reference herein in its entirety.

What is claimed is:

1. An image processing apparatus for processing a plurality of read images which are read by a plurality of readings of an original by a reading apparatus, comprising:
   a notifying unit configured to notify a user of an operation guidance, indicating each of a plurality of parts of the original corresponding to each of the plurality of readings, to allow the user to determine individually a part of the original which is read by each of the plurality of readings;
   an inputting unit configured to input the plurality of read images which are read by the plurality of readings, according to an instruction by the user based on the operation guidance notified by the notifying unit; and
   a processing unit configured to process each of the plurality of read images input by the inputting unit, as a read image corresponding to each of the plurality of parts of the original indicated by the operation guidance.

2. An image reading processing apparatus according to claim 1, wherein the notifying unit is configured to notify the operation guidance indicating a reading order of the plurality of parts of the original, and the processing unit processes the plurality of read images according to the reading order indicated by the operation guidance.

3. An image processing apparatus according to claim 1, wherein the processing unit is configured to cause a display screen to display each of the plurality of read images, in a display area of the display screen corresponding to each of the plurality of parts of the original indicated by the operation guidance.

4. An image processing apparatus according to claim 1, wherein the notifying unit is configured to cause a display apparatus to display a display item indicating each of the plurality of parts of the original corresponding to each of the plurality of readings.

5. An image processing apparatus according to claim 4, wherein the notifying unit is configured to cause the display apparatus to display a plurality of display items corresponding to the plurality of parts of the original.

6. An image processing apparatus according to claim 4, wherein the notifying unit is configured to change the display by the display apparatus according to the plurality of readings.

7. An image processing apparatus according to claim 6, wherein the notifying unit is configured to, in a case where a part of the original is read by the reading apparatus, delete a display item corresponding to the part of the original from the display screen.

8. An image processing apparatus according to claim 1, wherein the inputting unit is configured to input a read image obtained by reading a predetermined area of an original plate of the reading apparatus, and the notifying unit is configured to notify the operation guidance indicating each of the plurality of parts of the original which is placed on the predetermined area of the original plate.

9. A method for an image processing apparatus for processing a plurality of read images which are read by a plurality of readings of an original by a reading apparatus, comprising:
   notifying a user of an operation guidance indicating each of a plurality of parts of the original corresponding to each of the plurality of readings, to allow the user to determine individually a part of the original which is read by each of the plurality of readings;
   inputting the plurality of read images which are read by the plurality of readings, according to an instruction by the user based on the operation guidance notified; and
   processing each of the plurality of read images inputted, as a read image corresponding to each of the plurality of parts of the original indicated by the operation guidance.

10. A non-transitory computer-readable storage medium storing a computer-readable process, the computer-readable process causing a computer to execute the method of claim 9.

* * * * *